(12) United States Patent
Jarrell et al.

(10) Patent No.: US 8,903,558 B2
(45) Date of Patent: Dec. 2, 2014

(54) MONITORING PIPELINE INTEGRITY (75) Inventors: John A. Jarrell, San Anselmo, CA (US); Robert C. Hendrickson, Stillwater, MN (US)

(73) Assignee: IPiXC LLC, Tiburon, CA (US)

( * ) Notice: Subject to any disclaimer, the term of this patent is extended or adjusted under 35 U.S.C. 154(b) by 0 days.

(21) Appl. No.: 13/485,017

(22) Filed: May 31, 2012

(65) Prior Publication Data

US 2013/0030577 A1 Jan. 31, 2013

Related U.S. Application Data

(60) Provisional application No. 61/492,636, filed on Jun. 2, 2011.

(51) Int. Cl.
*F17D 5/00* (2006.01)
*G01M 3/24* (2006.01)

(52) U.S. Cl.
CPC . *F17D 5/00* (2013.01); *G01M 3/24* (2013.01); *G01M 3/243* (2013.01)
USPC ...................................... 700/282; 256/129.01

(58) Field of Classification Search
None
See application file for complete search history.

(56) References Cited

U.S. PATENT DOCUMENTS

| 2,008,934 | A |   | 4/1933 | Smith |  |
|---|---|---|---|---|---|
| 4,796,466 | A |   | 1/1989 | Farmer |  |
| 5,940,290 | A | * | 8/1999 | Dixon | 700/9 |
| 6,186,167 | B1 | * | 2/2001 | Grumstrup et al. | 137/487.5 |
| 6,389,881 | B1 | * | 5/2002 | Yang et al. | 73/40.5 A |
| 6,567,006 | B1 | * | 5/2003 | Lander et al. | 340/605 |
| 7,274,996 | B2 |   | 9/2007 | Lapinski et al. |  |
| 7,526,944 | B2 | * | 5/2009 | Sabata et al. | 73/49.1 |
| 7,607,351 | B2 | * | 10/2009 | Allison et al. | 73/592 |
| 7,859,403 | B2 | * | 12/2010 | Tampke | 340/539.18 |
| 8,502,456 | B2 |   | 8/2013 | Jarrell et al. |  |
| 2003/0079774 | A1 | * | 5/2003 | Reyman | 137/38 |
| 2003/0133464 | A1 | * | 7/2003 | Marejka et al. | 370/411 |

(Continued)

FOREIGN PATENT DOCUMENTS

FI WO2012001212 A1 * 6/2010

OTHER PUBLICATIONS

C.W. Snoek, "A Selection of New Developments in Multiphase Flow Measurement Techniques", Experimental Thermal and Fluid Science, vol. 3, No. 1, Jan. 1990, XP-002597583, pp. 60-73.*

(Continued)

*Primary Examiner* — Ryan Jarrett
*Assistant Examiner* — Michael J. Scapin
(74) *Attorney, Agent, or Firm* — Fish & Richardson P.C.

(57) ABSTRACT

A method of detecting and responding to a threat condition includes receiving, at a sensing module, an input acquired in proximity to a pipeline of a fluid distribution system, the input including data associated with a vibration measurement of the pipeline acquired by a sensor exterior of the pipeline. The method also includes determining whether the input indicates a threat condition by comparing the data to a previously recorded baseline vibration measurement. The method further includes automatically closing a first fluid transmission valve in response to a determined threat condition, thereby restricting flow of fluid through the pipeline in a vicinity of the first fluid transmission valve, and wirelessly transmitting a message for receipt by a control module that is remote from the sensing module, the message including indications of the determined threat condition, the first fluid transmission valve, and an identifier associated with the sensing module.

16 Claims, 6 Drawing Sheets

(56) References Cited

U.S. PATENT DOCUMENTS

| | | | |
|---|---|---|---|
| 2004/0049358 A1* | 3/2004 | Cook et al. .................. 702/45 |
| 2005/0060105 A1* | 3/2005 | Lander ......................... 702/51 |
| 2005/0246112 A1* | 11/2005 | Abhulimen et al. ........... 702/51 |
| 2006/0129338 A1* | 6/2006 | Turley et al. .................. 702/51 |
| 2007/0206521 A1* | 9/2007 | Osaje ......................... 370/315 |
| 2008/0082215 A1* | 4/2008 | McDowell .................... 700/282 |
| 2008/0188991 A1* | 8/2008 | Mulligan et al. .............. 700/282 |
| 2008/0250869 A1* | 10/2008 | Breed et al. ................ 73/861.27 |
| 2008/0291855 A1* | 11/2008 | Bata et al. .................... 370/311 |
| 2009/0035121 A1* | 2/2009 | Watson et al. ................. 415/1 |
| 2009/0037027 A1* | 2/2009 | Battiste ....................... 700/269 |
| 2009/0038405 A1* | 2/2009 | Hocker ...................... 73/861.01 |
| 2009/0125154 A1* | 5/2009 | Yli-Koski .................... 700/282 |
| 2010/0057262 A1* | 3/2010 | Boger ........................ 700/282 |
| 2010/0324839 A1* | 12/2010 | Martin ......................... 702/56 |
| 2011/0066297 A1* | 3/2011 | Saberi et al. ................ 700/287 |
| 2011/0093220 A1* | 4/2011 | Yang et al. .................... 702/51 |
| 2011/0173496 A1* | 7/2011 | Hosek et al. .................. 714/26 |
| 2011/0301881 A1* | 12/2011 | Danzy ......................... 702/50 |
| 2013/0151020 A1* | 6/2013 | Manninen et al. ............ 700/282 |

OTHER PUBLICATIONS

Awawdeh et al Wireless Sensing of Flow-Induced Vibrations for Pipeline Integrity Monitoring IEEE 2006.*

* cited by examiner

MONITORING PIPELINE INTEGRITY

CROSS-REFERENCE TO RELATED APPLICATIONS

This application claims priority to U.S. Provisional Application No. 61/492,636, filed Jun. 2, 2011. The disclosure of the prior application is considered part of (and are incorporated by reference in) the disclosure of this application

TECHNICAL FIELD

This disclosure relates to monitoring pipeline integrity and responding to a condition that threatens pipeline integrity

BACKGROUND

Fluid pipeline transportation systems or distribution systems can be used to transport fluids, such as liquids or gases. The fluids may be transported for long distances or short distances, through pipes that can be buried underground, or may be above ground. One example of a fluid that can be transported through a pipeline is natural gas. For example, an energy company may use a fluid pipeline transportation system to transport natural gas within a city, across a state, or across several states.

Fluid pipeline transportation systems may be susceptible to natural incidents such as earthquakes, floods, landslides, land collapses, and the like, especially because the systems may be dispersed across a wide geographic area. Additionally, the systems may be subject to accidents, such as a pipeline breach caused by an encounter with construction equipment. In some cases, acts of vandalism or terrorism may also threaten pipeline systems. Moreover, long-term degradation caused by corrosion, stress, or deformation accumulation can cause problems for pipeline systems. These natural incidents, accidents, destructive acts, or degradation can cause fluid leaks from the pipeline, which can lead to serious problems. For example, a natural gas leak or breach, when combined with a spark under certain situations, can produce an explosion that may injure or kill people, damage property, or pollute the environment.

SUMMARY

In a first general aspect, a computer-implemented method of detecting and responding to a threat condition includes receiving, at a sensing module, an input acquired in proximity to a pipeline of a fluid distribution system through which fluid is flowing, the input comprising data associated with a measurement of a vibration characteristic of the pipeline, wherein the data is acquired by a sensor positioned exterior of the pipeline. The method also includes determining whether the input indicates a threat condition for the pipeline by comparing the data to a baseline vibration measurement of the pipeline, the baseline vibration measurement having been previously recorded. The method further includes automatically closing a first fluid transmission valve of the pipeline in response to a determined threat condition, thereby restricting flow of the fluid through the pipeline in a vicinity of the first fluid transmission valve, and wirelessly transmitting a message via an antenna of the sensing module for receipt by a control module of the fluid distribution system that is remote from the sensing module, the message comprising an indication of the determined threat condition, an indication of the first fluid transmission valve, and an identifier associated with the sensing module.

In various implementations, the fluid may be selected from the group consisting of natural gas, water, and oil. Determining whether the input indicates a threat condition for the pipeline may include determining that a first amplitude of the data differs from a second amplitude of the baseline vibration measurement by at least a threshold amplitude amount, or determining that a first frequency of the data differs from a second frequency of the baseline vibration measurement by at least a threshold frequency amount. The message may be wirelessly transmitted over a network selected from the group consisting of a radio frequency network, a microwave network, the Internet, and a cellular network. The control module may be communicably connected to a plurality of sensing modules via a mesh network. The first fluid transmission valve may be located upstream of the sensing module. The method may further include automatically closing a second fluid transmission valve of the pipeline in response to the determined threat condition, the second fluid transmission valve being downstream of the sensing module. The control module may transmit one or more messages for receipt by one or more other valve controllers to automatically close a plurality of fluid transmission valves of the pipeline in response to the determined threat condition, wherein at least a first one of the plurality of fluid transmission valves is located upstream of the sensing module and wherein at least a second one of the plurality of fluid transmission valves is located downstream of the sensing module. The sensor may be an acoustic sensor, and the data associated with the measurement of vibration of the pipeline may represent an audible signal. The message may further include a time stamp. The method may further include periodically partially closing and then reopening the first fluid transmission valve. The control module may store an indication of the periodic partial closing and reopening of the first fluid transmission valve. The sensor may be in contact with an exterior surface of the pipeline and may not penetrate the pipeline. The identifier may include an internet protocol (IP) address of the sensing module. The message may further include a security question, and at least a portion of the message may be associated with a correct answer to the security question. The method may further include receiving a message from the control module that includes a command and a security question, where the command is associated with a correct answer to the security question so that the command is only executed if the security question is correctly answered. The control module may store the indication of the determined threat condition and the indication of the first fluid transmission valve in an electronic storage device.

In a second general aspect, an apparatus for detecting and responding to a threat condition includes a sensing module in proximity to a pipeline through which fluid is flowing of a fluid distribution system. The sensing modules receives an input acquired in proximity to the pipeline, the input includes data associated with a measurement of a vibration characteristic of the pipeline, wherein the data is acquired by a sensor positioned exterior of the pipeline. The apparatus also includes a processing module that: (a) determines whether the input indicates a threat condition for the pipeline by comparing the data to a baseline vibration measurement of the pipeline, the baseline vibration measurement having been previously recorded, and (b) automatically causes a first fluid transmission valve of the pipeline to close in response to a determined threat condition, thereby restricting flow of the fluid through the pipeline in a vicinity of the first fluid transmission valve. The apparatus further includes a communications module that wirelessly transmits a message via an antenna for receipt by a control module of the fluid distribu-

DESCRIPTION OF DRAWINGS

Like reference symbols in the various drawings indicate like elements.

DETAILED DESCRIPTION

Described herein are systems, devices, and techniques that can be used to monitor a fluid pipeline, detect a threat condition associated with the fluid pipeline, and perform an action in response to the detected threat condition. For example, integrity of a fluid pipeline can be monitored, threats to pipeline integrity can be detected, and actions that mitigate the threat, reduce a likelihood of escalation of the threat, contain the threat, diffuse the threat, or alert to the threat can be performed in response to detection of a threat condition. In some cases, threats that pose risk of serious damage or devastation may be responded to so that the damage or devastation is prevented. In some cases, threats that lead to some damage can be contained so that the damage is minimized. In various implementations, security provisions are included with communications passed between components of the system to prevent unauthorized access. The system can be configured to store records of threats, actions taken in response to threats, and statuses of components of the systems. The system can further be configured to store information pertaining to maintenance actions performed by components of the system, or of routine or periodic activation or testing of components of the system. In some examples, the system stores information regarding any of the above-described actions in compliance with record-keeping regulations, for example, and may provide convenient access to such information.

Fluid pipelines may transport fluids such as gases or liquids. Examples of fluids that can flow through a pipeline include natural gas, oil, biofuel, water, and others. In some implementations, because the fluids may be transported through the pipeline over great distances, the fluids can be highly pressurized. As the fluid flows through the fluid pipeline, it may pass through a series of transmission valves, each of which may be opened or closed to permit or prevent, respectively, fluid flow locally through the pipeline system at the valve.

In general, sensing modules can be used to sense a characteristic that may indicate a threat condition to the pipeline. In some implementations, one or more of the sensing modules can include a vibration sensor that can be used to measure a vibration of the pipeline. In some implementations, one or more of the sensing modules can include an acoustic sensor that can be used to measure an audible signal associated with the pipeline. The vibration or acoustic sensors can make measurements that can be used to estimate fluid flow or changes to fluid flow through the pipeline. In some implementations, one or more of the sensing modules can include a sensor that can be used to sense pressure or flow of the fluid flowing through the pipeline. In various implementations, the sensing module, and the sensor associated with the sensing module, may not physically penetrate the pipeline, and may be positioned exterior of the pipeline. For example, the sensor of the sensing module may be positioned on an exterior surface of the pipeline, and may be attached thereto in various implementations. In some implementations, the sensor may penetrate the pipeline (e.g., a pressure sensor or flow sensor). In some implementations, sensors exterior of the pipeline may detect actual leakage of fluid (e.g., detect leaked natural gas).

In various implementations, the sensing modules may compare a sensed characteristic to a baseline characteristic associated with a normal or typical operation of the pipeline system in the vicinity of the sensing module. The baseline characteristic may have been previously recorded, such as when the sensing module was commissioned or installed, and may be stored at an electronic storage location within the sensing module, or in a storage location accessible by the sensing module. If the comparison reveals that the sensed characteristic differs from the baseline characteristic by more than a predetermined amount, the sensing module may determine that a threat condition for the pipeline exists. For example, the sensing module may determine that a first frequency of the sensed characteristic (e.g., a measurement of vibration associated with the pipeline) differs from a second frequency of the baseline characteristic (e.g., a measurement of vibration associated with the pipeline that was previously recorded) by at least a threshold frequency amount. The sensing module may determine that the threat condition is associated with an area of the pipeline that is proximate the sensing module.

When the sensing module determines the existence of a threat condition for the pipeline, the sensing module may cause one or more valves of the fluid pipeline system to close. For example, the sensing module may transmit a message that directs a transmission valve module to close a transmission valve, thereby restricting flow of fluid through the pipeline near the transmission valve. The sensing module may transmit such a message wirelessly, over an antenna of the sensing module, for receipt by the transmission valve module, according to some implementations. The transmission valve module may wirelessly receive the message, over an antenna, and command the transmission valve to close, according to some implementations. Wired communications may also be used in some implementations.

As one example, the sensing module may cause the transmission valve that is immediately upstream, with respect to the location of the sensing module and a direction that the fluid is flowing, to close upon detection of a threat condition. As such, upon detection of a threat condition, the sensing module may automatically close a fluid transmission valve. In some cases, the sensing module may cause more than one transmission valve of the fluid pipeline to close in response to detection of a threat condition. For example, the sensing module may cause the transmission valve that is immediately upstream and the transmission valve that is immediately downstream, with respect to the location of the sensing module and the direction that the fluid is flowing, to close upon detection of a threat condition. In some implementations, the sensing module may automatically close more than one valve that is upstream of the sensing module upon detection of a threat condition, and in some implementations may similarly close more than one valve that is downstream of the sensing module upon detection of a threat condition.

The sensing module may wirelessly transmit a message, over the antenna of the sensing module, for receipt by a control module that is remote from the sensing module, where the message includes an indication of the determined threat condition, an indication of the one or more transmission valves that the sensing module caused to close, and an identifier associated with the sensing module. The control module that is remote from the sensing module may store some or all of the received information in an electronic storage location, such as a database server used to store data associated with the pipeline system. For example, the control module may store, in an electronic storage location, the indication of the determined threat condition and the indication of a fluid transmission valve that was closed. In some examples, the identifier may be an Internet protocol (IP) address of the sensing module. In some examples, the identifier may include a first identifier and a second identifier, each associated with the sensing module. The first and second identifiers may be distinct IP addresses, according to some implementations.

In various implementations, the message that the sensing module transmits for receipt by the control module may include additional information. For example, the message may include one or more time stamps or time indications, which may represent, for example, a time that a measurement was taken, a time that a threat condition was determined, a time that a transmission valve was closed (or commanded to close), a time duration between measurements, an indication of a rate of change, a time duration since an update to the sensing module, an indication of valve type or model, an indication of baseline value used (or another parameter of the threat determination), or others. These values may also be stored by the control module. Messages sent by the sensing module for receipt by the transmission valve module may also include one or more time stamps, such as one or more of the example time stamps described above, or other message information such as the examples discussed above.

In some implementations, the system (e.g., a central controller or a sensing module) may periodically cause one or more transmission valves to partially or fully close, and then reopen. This "stroking," "cycling" or "flexing" or "exercising" of a transmission valve may minimize a likelihood that the valve will seize or become stuck in a particular position, for example. The stroking of the transmission valve may be commanded once per day, once per week, one or more times per month, or according to any appropriate interval sufficient to prevent the valve from seizing in a particular position such that an emergency closure request (e.g., in response to a detected threat condition) would be hindered or prevented.

Figure 1A:
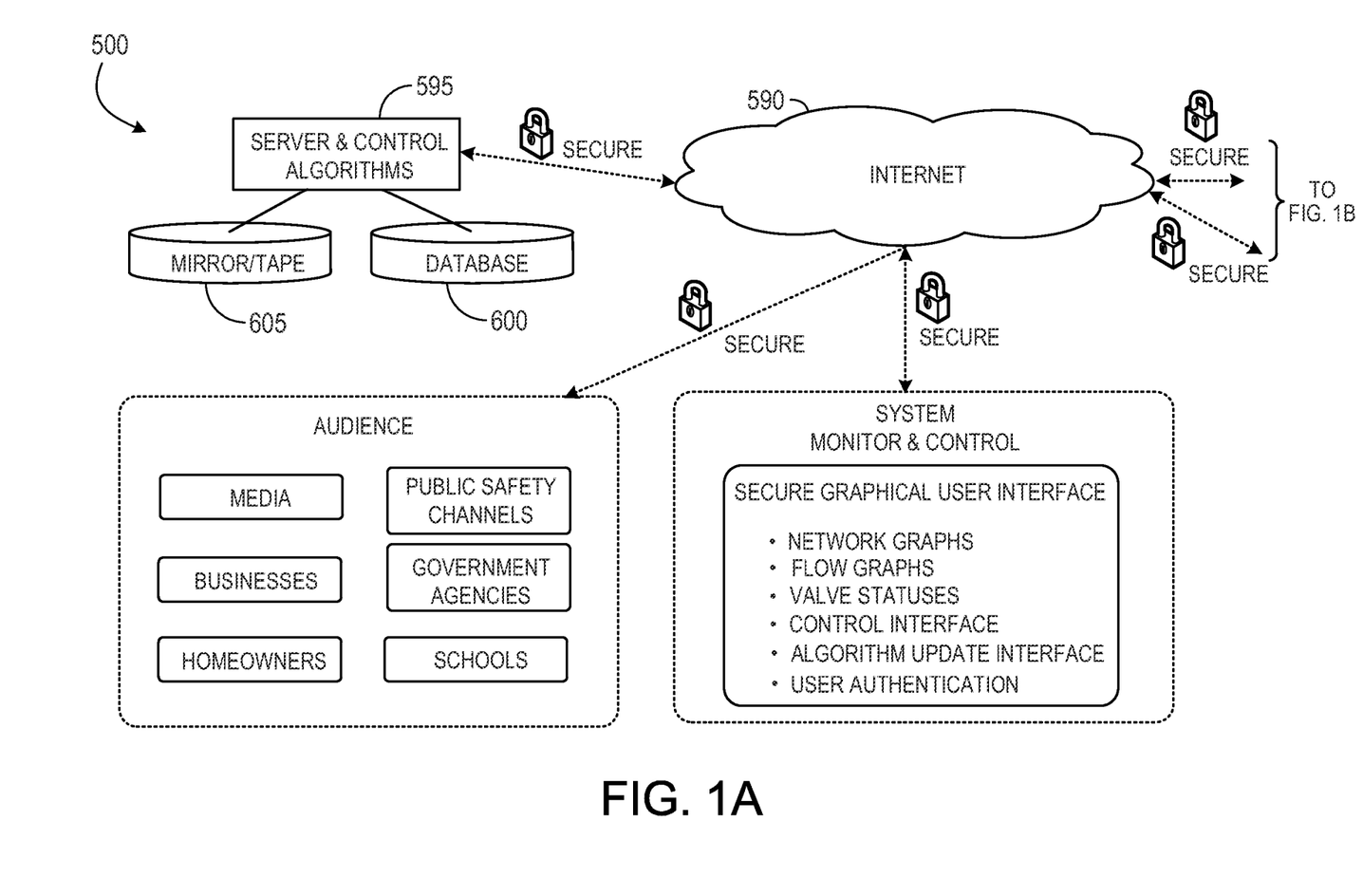
FIG. 1 shows a block diagram representation of an example pipeline monitoring system.
Figure 1B:
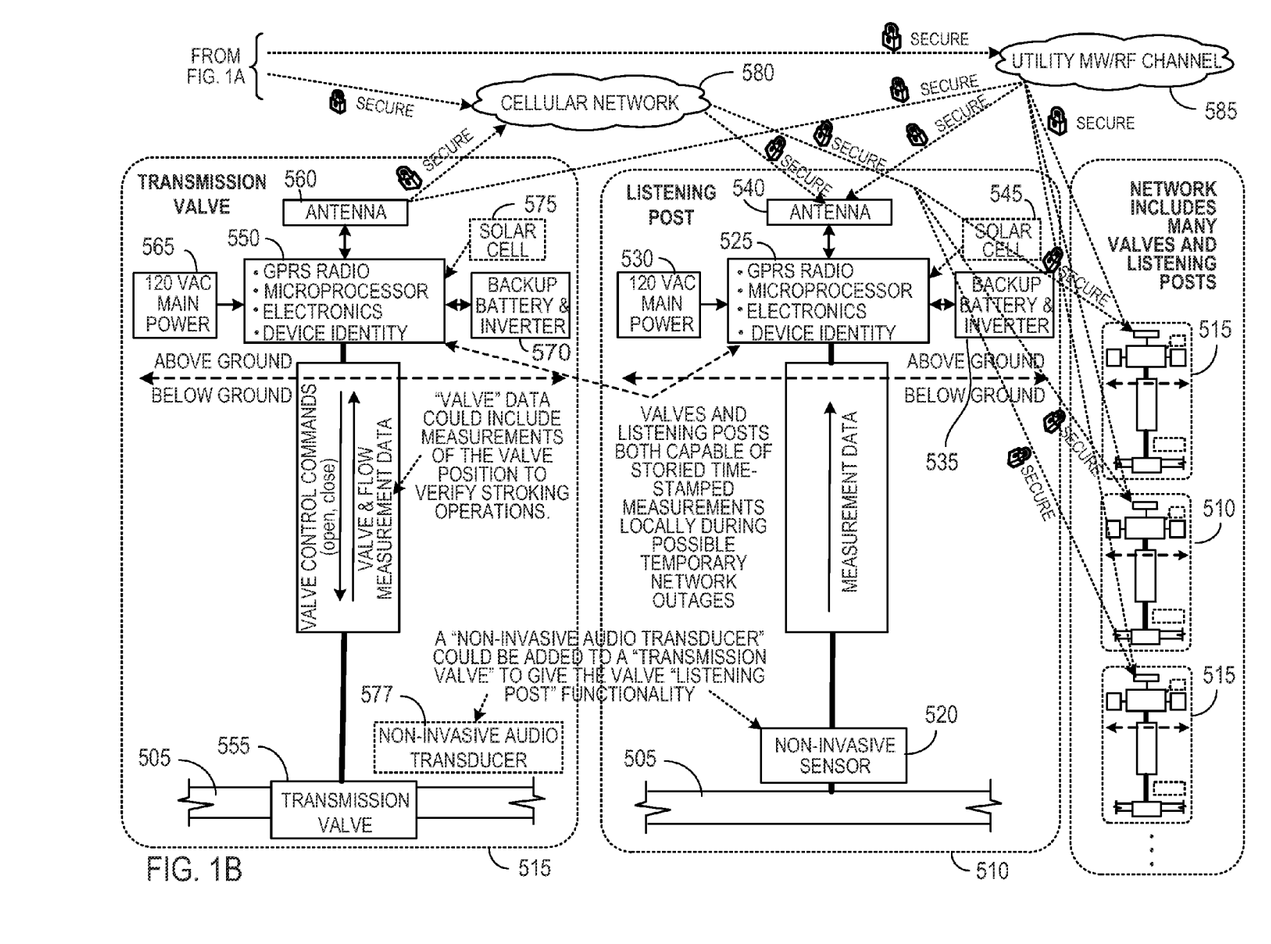

FIG. 1 shows a block diagram representation of an example pipeline monitoring system 500. The system or portions of the system can monitor integrity of a pipeline, detect threats to pipeline integrity, and respond to detected threats to pipeline integrity, for example in ways described above. Portions of a pipeline 505 are shown, and the pipeline 505 may transport fluids such as gases or liquids. The examples herein will assume that the fluid being transported by the pipeline 505 is natural gas, but in other examples fluids such as water, oil, propane, biofuel, or others may be used. The fluid may be under very high pressure, such as about 400 psi in some examples, and generally within a range of about 200 psi to 900 psi in various examples.

An example monitoring assembly 510 and an example valve assembly 515 are shown. The monitoring assembly 510 includes a sensor 520. The sensor 520 may be a vibration sensor that senses a vibration of the pipeline 505 in some implementations. The sensor 520 may be an acoustic sensor that senses an audible signal associated with the pipeline 505 in some implementations. The sensor 520 may not penetrate the pipeline 505, and may be located exterior of the pipeline 505. In some examples, the sensor may be bonded to an exterior surface of the pipeline, as by epoxy or another bonding agent.

A processing module 525 of the monitoring assembly 510 may include one or more processors that may execute instructions to perform tasks described herein. The processing module 525 can include an electronic storage device that stores the instructions and data. The processing module 525 may receive a measurement (e.g., a measurement of vibration) taken by the sensor 520, and may use the received measurement to assess pipeline integrity. For example, the processing module 525 may determine whether the received measurement indicates a threat condition related to the pipeline in a vicinity of the sensor 520.

The processing module 525 may compare the received measurement to a baseline measurement, and may determine that a threat condition exists if the received measurement differs from the baseline measurement by more than a predetermined amount (e.g., by more than an acceptable error amount). The baseline measurement may take several forms. For example, the baseline measurement may be a measurement that was made by the sensor 520 when the sensor 520 or the processing module 525 was installed or commissioned. In some cases, the baseline measurement may be updated, as the system may adjust the baseline measurement over time to better represent a normal or standard operating condition. As described above, the comparison can involve a comparison of frequencies. In some cases, more than one measurement is taken within a period of time and an average or suitable combination of the measurements is compared with the baseline measurement.

The monitoring assembly 510 also includes a power supply 530, which may convert line power to one or more voltages useful by the electronics of the processing module 525 and by the sensor 520, and includes a backup battery 535 that can be used to provide power to the monitoring assembly 510 in the event of a power outage, for example. An antenna 540 can be used by the processing module 525 to wirelessly transmit messages, such as the messages described above with reference to the sensing modules. An optional solar cell 545 that can convert solar energy to electrical energy may also be used to power the components of the monitoring assembly 510. In general, the sensing modules described above may include, for example, sensor 520, all or portions of processing module 525, and antenna 540. In some implementations, they may also include components 530, 535, or 545, for example.

The valve assembly 515 includes a processing module 550 that can provide commands to a transmission valve 555. For example, the processing module 550 can send an "open" command or a "close" command to the valve 555 to cause the valve 555 to open or close, respectively. In various implementations, the processing module 550 can command the valve to move incrementally (in either direction, e.g.) in addition to being able to command the valve 555 to fully open or fully close. The transmission valve 555 can receive the commands and open or close accordingly, thereby altering the flow of fluid through the valve 555. In some examples, the valve 555 may include electronics that permit data to be provided from the valve 555 to the processing module 550 of the valve assembly 515. Such data could include indications of the valve position (e.g., how far open or closed). The valve assembly 515 also includes an antenna 560, power supply 565, battery 570, and an optional solar cell 575. Optionally, valve assembly 515 can include a sensor 577, similar or identical to sensor 520, that can be used to measure a characteristic of the pipeline (e.g., a vibration), and the processing module 550 of the valve assembly 515 may receive the measured characteristic and determine whether a threat condition exists in a similar manner as described above with reference to the sensing modules and module 525.

As described above, when the monitoring assembly (e.g., at processing module 525) detects a threat condition to the pipeline 505, it may send a message indicating that a valve should be closed. For example, processing module 525 may wirelessly transmit a message, via antenna 540, for receipt, via antenna 560, by the transmission valve assembly 515. The processing module 550 of the valve assembly 515 may interpret the message and command the transmission valve 555 to close.

The message may be transmitted over a network. In the example shown in FIG. 1, the message is transmitted over a cellular network 580. In other examples, the network may be a microwave network, or a radio frequency (RF) network. In some cases, wired transmissions may be used. In various implementations, the network may be a public network or a private network. As will be described in more detail below, the message transmissions may be secured using encryption and techniques to verify that the messages are genuine. In some examples, the message may be transmitted over the Internet 590. For example, the monitoring assembly 510 may wirelessly transmit a message that passes through the cellular network 580, over the Internet 590, and again over the cellular network 580 for wireless receipt by the valve assembly 515.

In some examples, the message may be transmitted over two networks for redundancy. For example, the message may be transmitted from the monitoring assembly 510 to the valve assembly 515 over a cellular network 580, and additionally over a microwave network or an RF network 585. In some examples, the message may be transmitted over the Internet 590. In some implementations, one of the networks may be a public network (e.g., cellular network 580) and one of the networks may be a private network (e.g., network 585). Regarding the private network, for example, a utility company may operate its own private communications network (e.g., a microwave or RF network) that includes security provisions to prevent unauthorized access.

While a single monitoring assembly 510 and valve assembly 515 are shown in detail in FIG. 1, the system 500 may include several monitoring assemblies 510 and several valve assemblies 515. This is represented near the right side of FIG. 1, where representations for additional valve assemblies 515 and monitoring assemblies 510 are shown. In some examples, where the pipeline 505 stretches over hundreds or thousands of miles, valve assemblies 515 may be spaced approximately one mile apart along the pipeline. In various implementations, a monitoring assembly 510 may be disposed between each of the valve assemblies 515. In some examples, two or more monitoring assemblies 510 may be disposed between valve assemblies 515, and in some examples there may not be a monitoring assembly 510 between two particular valve assemblies 515.

As described above, the monitoring assembly 510 may transmit a message for receipt by a control module 595 that is remote from the monitoring assembly 510. The message may include an indication of the determined threat condition, an indication of the one or more transmission valves that the sensing module caused to close, and an identifier associated with the sensing module. If no threat condition was determined, the message may indicate an absence of a threat condition. The control module 595 may store some or all of the received information in an electronic storage location, such as in a database 600 used to store data associated with the pipeline system 500. For redundancy, the stored data may be backed up in a secondary storage location 605. The control module may accumulate and store data associated with the pipeline for historical preservation, which data may be reviewed or analyzed as appropriate (e.g., during or in anticipation of an audit).

In some examples, the control module 595 may transmit messages for receipt by a valve assembly 515 or a monitoring assembly 510. For example, the control module may send a "close valve" command to a valve assembly 515, which may cause the module 550 to command the valve 555 to close. In some examples, the control module 595 may send calibration data, algorithm parameter updates, software updates, schedule updates, threat information, security level information, or the like, to one or more of the monitoring assembly 510 or the valve assembly 515. In response, the monitoring assembly 510 or the valve assembly 515 may alter operations in accordance with the received message. For example, if the control module 595 indicates that the monitoring assembly 510 should adjust its baseline characteristic or its comparison threshold used in determining whether a threat condition exists, the monitoring assembly may store the information and update its processing functionality accordingly. FIG. 1 shows that messages passing between the control module 595 and the valve assembly 515 or the monitoring assembly 510 pass over the Internet 590 and cellular network 580. In some cases, the messages (in either direction) may only pass over the Internet 590, may only pass over the cellular network 580, or may only pass over a microwave network or an RF network (e.g., network 585). That is, communications between the any of the control module 595, the valve assembly 515, or the monitoring assembly 510 may be over any combination of the various networks shown in FIG. 1, depending on the implementation.

As another example, the control module 595 may send out an "all clear" message to valve assemblies 515 that had been previously commanded to close their respective valves 555 in response to a detected threat condition. Upon receipt of such a message, the processing module 550 of the valve assembly 515 may command the valve 555 to open.

FIG. 1 shows certain portions of the monitoring assembly 510 and the valve assembly 515 being above ground, and certain portions being below ground, but these representations are exemplary only. For example, in the case of a buried pipeline 505, the valve 555 and sensor 520 are shown below ground but in some implementations one or more of the processing modules 525, 550, the power supplies 530, 565, or the batteries 535, 570 could also be buried below ground.

The control module 595 may receive messages from each of the monitoring assemblies 510 and optionally from valve assemblies 515, and may determine a scope of a threat. For example, the control module may determine, based on one or more messages received from monitoring assemblies 510, that a serious threat to pipeline integrity exists, and may send alerts to one or more appropriate parties. The alerts may include, for example, an indication of a location associated with the threat, such as a location of the monitoring assembly 510 or a valve assembly 515, and in some cases an assessment of the seriousness of the threat. Such an assessment may be made, for example by the monitoring assembly 510 based on the comparison of the measured characteristic with the baseline characteristic, or by the control module 595 based on, e.g., a number of monitoring assemblies 510 reporting a threat condition over a period of time. In some examples, one or more alerts issued by the control module 595, or the monitoring assembly 510, may take the place of an automatic valve closure operation. That is, instead of the system automatically causing a valve to close when a threat is detected, either the control module 595 or the monitoring assembly may send an alert for receipt on an electronic device (e.g., a desktop computer, laptop computer, electronic tablet device, smartphone, cellular phone, personal digital assistant, pager, or the like, to notify personnel of the threat so that a manual or other action may be taken.

For example, first responders within the energy company may be alerted, as by a phone call, email, page, sounding of an alarm, or the like. In some cases, if the threat is deemed significant enough, one or more fire departments, police departments, medical responders, or public safety channels may be alerted to the threat. In some cases, one or more government agencies may be alerted to the threat. In some cases, homeowners, businesses, or schools within the vicinity of an area associated with the determined threat may be alerted. Media outlets may be alerted in some cases so that the threat may be publicized to alert people to avoid or move away from the affected area. In some embodiments, the monitoring assembly 510 may also be able to transmit one or more of the messages discussed above.

In some implementations, the control module 595, in lieu of or in addition to the monitoring assembly's determination of a threat, may determine a presence of a threat condition based on received measurements from a monitoring assembly and comparing the measurements with a baseline value (in similar fashion as discussed above). In some cases, the control module 595 (or a monitoring assembly) may utilize measurements from two or more monitoring assemblies in determining the existence of a threat condition. For example, a difference quotient of measured signals or values associated with the measured signals may be computed, and used in a comparison with a baseline signal or value.

Figure 2:
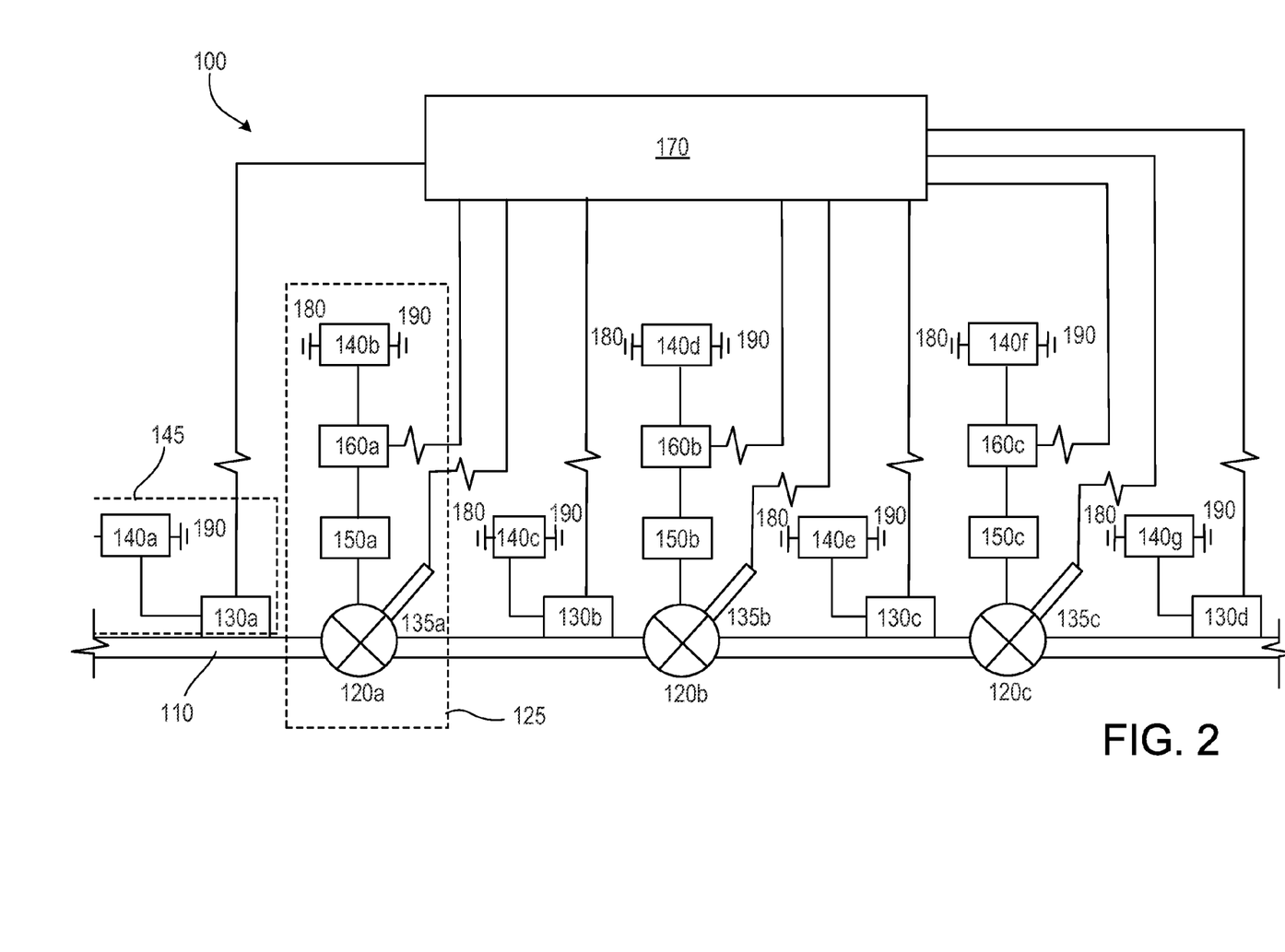
FIG. 2 shows a schematic view of an example section of a pipeline monitoring system.

FIG. 2 shows a schematic view of an example section of a pipeline monitoring system 100 that includes a pipeline 110, a transmission valve assembly 125, a monitoring assembly 145, and a central system 170. In various implementations, the transmission valve assembly 125 may correspond in part or in whole to the valve assembly 515 of FIG. 1, the monitoring assembly 145 may correspond in part or in whole to the monitoring assembly 510 of FIG. 1, and the central system 170 may correspond in part or in whole to the control module 595 of FIG. 1.

The pipeline 110 may include sections of tubular structure connected at their ends by various joints. The pipeline 110 may generally be buried underground (e.g. 3-7 feet below ground), but may include portions that are above ground (e.g. across a river). The pipeline 110 can be made from metallic or polymer materials such as steel or plastic. The inner diameter may vary in size from about 50 mm to 2000 mm, or any appropriate diameter depending on pipeline type. In some embodiments, certain sections of the pipeline 110 can be connected by a transmission valve 120 (e.g., valves 120a, 120b, 120c). Distance between transmission valve assemblies 125 can vary, with example distances including about one-half mile, one mile, two miles, five miles, ten miles, or fifteen miles. The pipeline 110 can be any appropriate type of pipeline, such as a gathering pipeline, a transportation pipeline, or a distribution pipeline. The pipeline 110 may be part of a complex pipeline network system that includes an initial injection station, compressor stations, partial delivery stations, block valve stations, regulator stations, and final delivery stations, to list just a few examples.

In FIG. 2, the transmission valve 120 structurally connects two sections of the pipeline 110 and may be closed or opened as described above to affect flow rate of fluid through the pipeline 110. The transmission valve assembly 125 may include a transmission valve 120a, a sensing device 135a, an actuator 150a, a control network interface 160a and a power supply 140b.

The transmission valve 120a may be any appropriate pipe fitting device that regulates the flow of a fluid by opening, closing, or partially obstructing various passageways. Some specific embodiments may include flow regulation valves (such as a butterfly valve, a choke valve, a globe valve, a piston valve, etc.) and on/off valves (such as a ball valve, a gate valve, a knife valve, or a plug valve). In a general embodiment, the transmission valve 120a may include a body, ports, a seat, a stem, a disk, a handle, and a bonnet. The body may be the outer casing of most or the entire valve that contains the internal parts. The bonnet may be the part of the encasing through which a stem (e.g., a movable part that seals and controls the passage size within) passes and that forms a guide and seal for the stem, acting as a cover on the body. The bonnet may screw into or be bolted to the body. Valve bodies may be metallic, e.g., brass, bronze, gunmetal, cast iron, steel, alloy steels or stainless steels. Dependent on internal pressure and temperature of the application, valve bodies may also be plastic, e.g., PVC, PP, PVDF or glass-reinforced nylon. The other components may be assembled within and around the body and bonnet in such a manner that the stem may sealingly adjust the passage resistance to change the flow rate, including a complete seal-off.

In this example, the valve assembly 125 includes a sensing device 135a. The sensing device 135a is shown attached to the valve 120a, but alternatively could be attached directly to the pipeline 110. In some examples, the valve assembly 125 may not include a sensing device 135a. Sensing device 135a may be a vibration sensor, an acoustic sensor, or any of the other types of sensors discussed herein. When the pipeline 110 is transporting fluid the motion of the fluid correspondingly may produce certain vibration, sound, or deformation characteristics. For example, a frequency of vibration (or pitch or frequency of sound, e.g.) produced by gas flowing through the pipe 110 or transmission valve 120a may change as flow rate changes. The flow rate may change unexpectedly, for example, when a leak, puncture, or breach of the pipeline develops, which may cause a measured characteristic (e.g., vibration) to correspondingly change. In an event of a leak, puncture, or breach, flow rate and pressure of the fluid may drop, and may be accompanied, e.g., by a change in measured frequency in the vicinity of the leak, breach or puncture. Under standard operation, a signature characteristic of vibration, sound or deformation may be used to examine the soundness of the transmission valve 120a or pipeline 110, as the flow rate may be set to a constant value. This may be done at commissioning, as one example. These mechanical properties may be used for monitoring and may be provided as feedback to the central control system 170.

In some embodiments, the sensing device 135a may be an acoustic sensor, such as a microphone, that transforms sound into an electrical signal. The microphone may use electromagnetic induction, capacitance change, or piezoelectric generation to produce an electrical voltage signal from sensed mechanical vibration. For example, an electromagnetic induction microphone may be robust, relatively inexpensive and resistant to moisture, and include a high gain before feedback, which may be suitable for systems that cover a wide geographical area and are exposed to varied environmental conditions.

In some embodiments, the sensing device 135a may be a piezoelectric sensor that converts pressure, acceleration, strain or force into an electrical signal. Piezoelectric materials may commonly possess a high elastic modulus that is compatible to many metals. The sensing element in a piezoelectric sensor may have insignificant deflection when loaded, which may result in an overall rugged sensor. Piezoelectric sensors may have excellent linearity over a wide amplitude range, and may be relatively insensitive to electromagnetic fields and radiation, which may permit measurements under harsh environmental conditions.

In some embodiments, the sensing device 135a may be a vibration sensor, such as an accelerometer, that transforms mechanical vibration into an electrical signal. In various implementations, the vibration sensor may behave as a damped mass on a spring, such that when the sensor is vibrated, the mass may be displaced to the point that the spring is able to accelerate the mass at the same rate as the casing. The displacement can then be measured to determine the acceleration of the vibration. For example, some accelerometers may use piezoelectric, piezoresistive or capacitive components to convert the mechanical motion into an electrical signal. Some piezoelectric accelerometers that rely on piezoceramics (such as lead zirconate titanate) or single crystals (such as quartz or tourmaline) may have excellent upper frequency range and high temperature range. Some capacitive accelerometers may use a silicon micro-machined sensing element to achieve excellent low frequency range, high stability and linearity. Some other accelerometers may be small micro electro-mechanical systems that include a cantilever beam with a proof mass for measurement. Other types of vibration sensors can alternatively be used.

In some other embodiments, the sensing device 135a may be a strain or stress sensor, such as a strain gauge or a transducer that transforms structural deformation into an electrical signal. For example, a strain gauge may include an insulating flexible backing which supports a metallic foil pattern that changes electrical resistance as it deforms. The gauge may be adhesively attached to a measurement surface by any appropriate adhesive, such as cyanoacrylate. As the measurement surface deforms, the foil pattern may elastically deform and cause a change in its electrical resistance, which may be measured with a Wheatstone bridge. For measurement of small strain, semiconductor strain gauges (e.g. piezoresistors), may be used instead of foil gauges. Any of the sensors discussed herein (e.g., sensor 520 or sensors 130 or 135, discussed below) may include features of the sensing devices discussed above.

The transmission valve 120a may be controlled or actuated by the actuator 150a. The actuator 150a may be operated by a source of energy such as an electric current, hydraulic fluid pressure or pneumatic pressure. In some embodiments, the actuator 150a may include a motor, a mechanical transmission, and an optional disengagement clutch. The motor may generate rotation motion that is transferred to the transmission valve 120a via the mechanical transmission to control (e.g. to change flow rate, or to completely seal-off flow) the movement of the sealing element (e.g. a stem) within the transmission valve 120a. The motor may be an electric motor that utilizes power from an electrical power source to produce the motion. The mechanical transmission may be a gearbox that reduces the rotational speed of the motion and increases the torque so that the motion may overcome a greater resistant force. The mechanical transmission output may be coupled to the sealing element of the transmission valve 120a via the disengagement clutch, which may enable an instant disengagement for the transmission valve 120a from the actuator 150a.

The actuator 150a may communicate with the central control system 170 via the control network interface 160a. Communications may be wireless (e.g., over any of the networks discussed above) or wired, depending on the implementation. The control network interface 160a may allow for reporting status of the actuator 150a to the central control system 170, receiving control signals from the central control system 170, and use of overriding commands (e.g. manual input). In some embodiments, the control network interface 160a may be any appropriate electrical system that include a processor, a storage device (e.g., random access memory, read-only memory, a solid state drive, a hard disk, etc.), and a connection to a network. In various implementations, the central control system 170 can monitor pipeline operation and send out control signals (e.g. a sealing command) to the actuator 150a. In certain instances, human on-site operation or control of the valve 120a may be preferred, and the valve assembly 125 can include an input device that enables an operator to override automatic controls, for example.

The transmission valve assembly 125 may be powered by the power supply 140. The power supply 140 may convert another form of energy (e.g. mechanical, chemical, solar, etc.) to electrical energy, or regulate electrical energy to a certain output voltage or current value. In some embodiments, the power supply 140 may include a connection to a power line 180 and optionally to a secondary power source 190. The power supply 140 may convert or regulate the power from the power line 180 from alternating current to one or more direct current supplies at predetermined voltages that are useful by the assembly 125. The secondary power source 190 may be a battery (e.g. a lead acid battery, a lithium polymer battery, a charged capacitor, an alkaline battery, a solar cell, or the like), a solar station, a wind mill generator, a geothermal generator, or/and a combination of the foregoing. The secondary power source 190 may ensure the normal operation of the transmission valve system 125 in case of failure of the power line 180. The sensing device 135a is shown communicating directly with the control system 170 in FIG. 2, but such communication may include use of the network interface 160a in some implementations.

The monitoring assembly 145 includes a sensing device 130a and a power supply 140a. The monitoring assembly 145 may generally be located about halfway between valve assemblies 125, in some implementations. The sensing device 130a may be substantially similar to sensing device 135a, and may include a network interface 160 (not shown) in some implementations. The power supply 140 has been described above with reference to the transmission valve assembly 125. The pipeline 110 may be monitored with the sensing device 130a that is in communication with the central control system 170 to form a control loop.

The central system 170 may include a computing device, and communications may occur securely over a communication network (e.g. the Internet, microwave network, a radio frequency network, etc.). The computer may execute programs to perform techniques discussed herein, and may store data in a storage device (disk, optical memory device, flash device, removable storage device, tape, and the like) for later retrieval. In some embodiments, the central system 170 collects data from the sensing devices 130 and 135 via communications over the network, and determines whether a threat condition exists with respect to pipeline integrity. The data may include some or all of the following: a measured characteristic of the pipeline (e.g., a vibration measurement, an acoustic measurement, a displacement measurement, a temperature measurement), a time stamp, one or more identifiers associated with the communicating device, an indication of location, a status or condition (e.g., of the corresponding sensing device), a schedule, a maintenance history, an indication of a trend in recent measurement data (e.g., covering the last couple or several measurements, or covering a particular time period), or an indication of communication channel quality.

In various implementations, the central system 170 may organize and store the data so that accurate records of pipeline system characteristics may be preserved and later accessed. A user, such as a supervisor for the energy company, may access and monitor the collected data in various ways, such as via a web portal, via devices such as a personal computer, a portable digital assistant, a cellular phone, or the like.

The central system 170 may analyze the collected data to assess a state of the pipeline system. If an anomaly associated with a single sensing device 130 or 135, or associated with two or more sensing devices 130 or 135, the central system 170 may send command signals to transmission valves in the vicinity (e.g., upstream-of, or both upstream- and downstream-of) the corresponding sensing device 130 or 135 to cause fluid to cease flowing in the area of the threat so that risk of damage may be reduced. In this manner, the central system 170 may isolate the problematic section or portion of the pipeline, which may prevent a catastrophic situation and may minimize any potential damage related to the threat.

For example, if the sensing device 130*b* measures a characteristic that is determined to be related to a threat (e.g. a leakage, a pipeline breach, a blockage, etc.), the central control system 170 may issue commands to close transmission valve 120*a* (the upstream valve), or to close each of transmission valves 120*a* and 120*b* (both the upstream valve and the downstream valve). Closing the downstream valve may prevent bleed-back of fluid, for example. In some examples, more than one valve that is upstream of the device at or near which the problem was sensed may be closed, and similarly more than one valve that is downstream of the problematic device or area where the problem occurred may be closed (e.g., close the two, three, four, five, six, seven, eight, or more valves that are upstream or downstream of the valve at or near where the problem was detected). In this manner, a problem may be quickly isolated so that a condition that may initially be relatively minor (or even relatively major) does not unduly progress to become catastrophic. This may prevent or mitigate injuries and/or damage to property. In some examples, several valves may be commanded to close simultaneously or near simultaneously. In some examples, a staggered closing pattern may be commanded, so that a first command or series of commands to close may be issued to the one or more valves in closest proximity to the detected threat condition, and then later (e.g., 5 seconds later, 10 seconds later, one minute later) a second command or series of commands to close may be issued to one or more valves that are upstream or downstream (or to valves that are upstream and to valves that are downstream) of the one or more valves previously closed.

As another example, if the sensing device 135*b* associated with transmission valve 120*b* measures a characteristic indicative of a threat condition, the central control system 170 may command valve 120*b* to close (the valve nearest the sensor that measured the characteristic), or may command each of valves 120*a* and 120*b* (the valve nearest the measuring sensor and the valve immediately upstream therefrom) to close, or may command each of valves 120*a*, 120*b*, and 120*c* (the valve nearest the measuring sensor, and the valves immediately upstream and downstream therefrom) to close. In a general aspect, for each sensing device that measures a characteristic that is determined to indicate a threat, the central control system 170 may command a sealing action for the upstream transmission valve, as well as for the downstream transmission valve, or for both. In some cases, additional valves upstream or downstream from the measuring sensor may be commanded to close. In addition to detecting threats, the central control system 170 (or the sensing assembly, for example) may send alert signals to maintenance personnel so that manual shut-off may be employed as a backup or alternative. In some cases, manual engagement may include an operator overriding command signals sent by the control system 170, which commands may be known by or available to authorized personnel. Such commands may be manually entered at the valve location at an input device, if applicable, or may be sent in some cases from devices such as a personal computer, a tablet device, a phone, a portable digital assistant, or any other appropriate device.

In some embodiments, each component that communicates over one or more of the various networks discussed herein may be assigned an individual and specific Internet Protocol address (IP address) for communication over the network. The IP address may be used, for example, to identify the particular component or a location associated with the component. In some cases, the address may be used to determine a priority. The IP address provides host or network interface identification and location addressing. The IP addresses may be assigned to a host either anew at the time of booting, or permanently by fixed configuration at the component, or by use of dynamic addressing.

In some implementations, two distinct IP addresses are used for each component communicating via the networks described. This may provide additional security, according to some implementations. The first IP address may be used in the industry-standard way, and industry-standard encryption techniques may be used (this may also be the case, for example, in implementations that use only a single IP address). The second IP address may be used with a proprietary algorithm to add additional security and prevent unauthorized control of system valves or control centers.

In some implementations, a single IP address could be used, but could require two (rather than the standard one) keys—an industry-standard key and a proprietary key that is under the control of the pipeline operator. As such, the utility (e.g., an energy company) may build a command that is encrypted/protected/signed using its secret key information. This first layer may then be encrypted in the standard way, and a second layer of protection may thereby be realized. Commands could be more securely transmitted and received in certain implementations.

In various implementations, modular or device-level cyber security features may be provided. For example, a hardware or software (or both) component may be included at each valve or valve controller installation to provide secure communications with the central controller. With reference again to FIG. 1, the processing module 550 of the valve assembly of the monitoring assembly 510 may include a socket, connector, or interface mechanism that accepts a modular security chip or board that provides some or all of the security features discussed below with reference to FIG. 5. A utility company could then, for example, choose to install or not install the modular security mechanism based on a number of factors, such as cost considerations, expected threat levels, security redundancies, government or other regulations, and the like.

Figure 5:
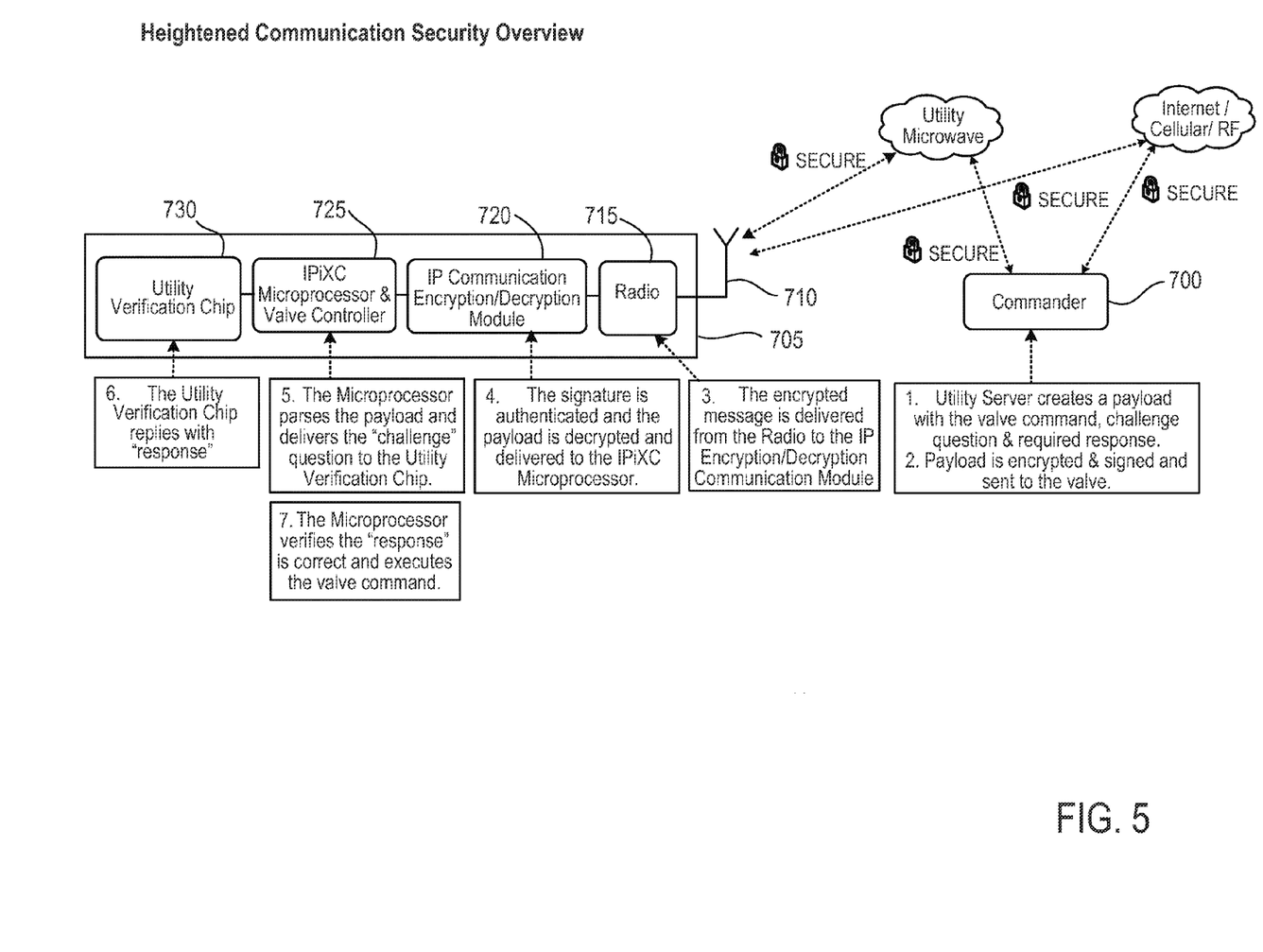
FIG. 5 illustrates an example of a heightened communication security protocol.

FIG. 5 illustrates an example of a heightened communication security protocol. A commander 700, which may be the control system in some implementations or a monitoring assembly in some implementations, may create a communications payload that includes a command to be applied to a valve of the pipeline system, and includes a challenge question and required response. The payload is encrypted and signed and sent to the valve 705 (or a controller in charge of the valve) wirelessly via a network (e.g., a microwave network, the Internet, a cellular network, an RF network, or a combination of the foregoing). The valve controller 705 receives the message over an antenna 710 of the valve controller. A radio module 715 of the valve controller delivers the encrypted message to an IP Communication module 720, where the signal is authenticated and the payload is decrypted. The decrypted payload is then delivered to a processor 725, which parses the payload and delivers the challenge question to a verification module 730. The verification module interprets the challenge question and replies with an answer to the question. The processor 725 verifies that the response from the module 730 matches the response included in the message, and executes the command (e.g. causes the valve to open or close according to the command). If the answer is incorrect, the command is not executed. This may add an extra layer of security of standard encryption/decryption methods, and may add a utility-specific check on security. That is, the utility (e.g., an energy company) in charge of the pipeline system may be the only party with access to module 730, and may be the sole entity in charge of the security questions or changing the questions/answers. In some cases, challenge-response security pairs may be one time use only, and may be time-limited. The module 730 may need to provide a correct response within a predetermined period of time; otherwise a timeout may prevent further action.

The "challenge/response" description is symbolic. The implementation would be cryptographic & mathematical with the following goals: One-Time Use Only: Each "challenge/response" can be used only once; Time-Limited: "challenge/response" pairs would expire to prevent interception & blocking of messages and later playback; Robust & Simple: A simple interface & mechanism are more resilient to sabotage; This Verification can also be used for other sensitive operations such as firmware updates.

For added security the utility can stock PCBs "without" the verification chip and install the chip on the PCB right before installation at the valve site.

The overall security approach involves two levels. First: the backbone of the network relies on tried-and-true, regulatory-compliant, industry standard encryption & authentication techniques. Second: each end-to-end command or measurement is subjected to an additional verification step that is controlled exclusively by the Utility. Key management and record keeping are managed diligently throughout design, manufacturing, installation and life-cycle.

The Utility Server includes "Utility Verification Chip" functionally as an additional measure to verity the authenticity of measurements arriving from listening posts. Measurement authenticity is vital because measurements can trigger server valve commands. (The functionality could be embedded in the server or provided as a module connected to the server via USB or serial port.)

The Utility Server will include "IP Communication Encryption/Decryption" functionality.

Communication is possible over either the internet or private channel, or both.

In some implementations, all communications between components of the pipeline monitoring system may be subject to a security protocol similar to that described above with reference to FIG. 5. For example, control module 595, sensing assembly 510, or valve assembly 515 may include one or more aspects of FIG. 5 (e.g., radio 715, module 720, processor 725, chip 730) and may decode messages received in the manner described above. Similarly, any of control module 595, sensing assembly 510, or valve assembly 515 may be configured to assemble messages that include a message payload with a challenge question and response. In some cases, encryption and decryption provided by module 720 may be sufficient to alleviate security concerns, but in some cases the extra security afforded by the challenge question (or security question) and answer functionality may be desired. Components that send commands may be configured to provide payloads and challenge questions/responses. Components that receive commands or updates may be configured to receive and process the payloads and challenge questions. In various implementations, the communications algorithms used by the various components may include detection of attempts by unauthorized parties to jam the system, as by a type of cyber-attack. In some examples, a single IP address can be used for communication between components of the system. In some examples, two IP addresses can be used for communication between components of the system.

In some embodiments, detecting pipeline anomalies of threat conditions may be based on a comparison of a current sensor signal measurement and a reference signal profile measured under particular operation conditions. The reference profile may then be used to compare against new signals measured, in terms of, for example, a function of time, a function of frequency, peak values, average values, etc. An acceptable error (e.g., an acceptable difference between the measured signal and the reference profile) may be set or defined as a criterion to trigger alert or control commands from the central control system 170.

In some embodiments, the central control system 170 may regularly issue commands to maintain operational conditions of the transmission valves 120. For example, the central control system 170 may command the transmission valves 120 to move periodically (e.g., once per day, once per week, once per month, etc.) at a certain opening (e.g., 5%, 10%, 15%, 20%, etc.) to prevent the transmission valves 120 from seizing open, which may occur over time if unchecked, for example. For example, the central control system 170 may command the valve to move a predetermined amount (or to a predetermined position) from its present position, and then may command the valve to return to the position occupied previously. Such exercise may loosen and remove deposited contaminants at the valves, for example, and maintain the operability of the transmission valves 120. In some embodiments, even when contaminants are not present in significant quantities, the transmission valves 120 may seize due to affinity of "like" metals for one another.

In some implementations, the transmission valves 120 may include sensors or electrical contact points that provide feedback information that indicates whether a portion of the valve moved (or moved a sufficient amount) in response to a command to move. For example, the central system 170 may periodically issue a command to one or more transmission valves 120 to partially or completely close the one or more valves for a short period of time (e.g., command the valve to move about 20% of its full-length), and the sensors or electrical contact points may detect whether valve movement in response to the command occurs. If the valve moves as commanded, an indication of the proper movement may be stored by the central system 170, along with other information such as an indication of the particular valve, date and time, and the like. If the valve does not move as commanded, an indication of the failure may be similarly recorded by the central system 170, and a warning message may be generated, for example, so that repair personnel may be dispatched to the location of the faulty valve.

In some embodiments, two or more sensing modules may collaborate by contributing signals according to a predetermined weighting distribution. For example, signals measured at different locations may have different significance/priority with respect to threat determination. The control system 170 (or one of the sensing modules) may use the weighting distribution in determining whether a threat exists, according to some implementations. In some embodiments, some or all of the devices of a pipeline network may be communicably coupled to the central control system 170, and/or may communicate with each other via a mesh network. The mesh network may offer fault-tolerant communications among or between components of the system in certain situations.

Figure 3:
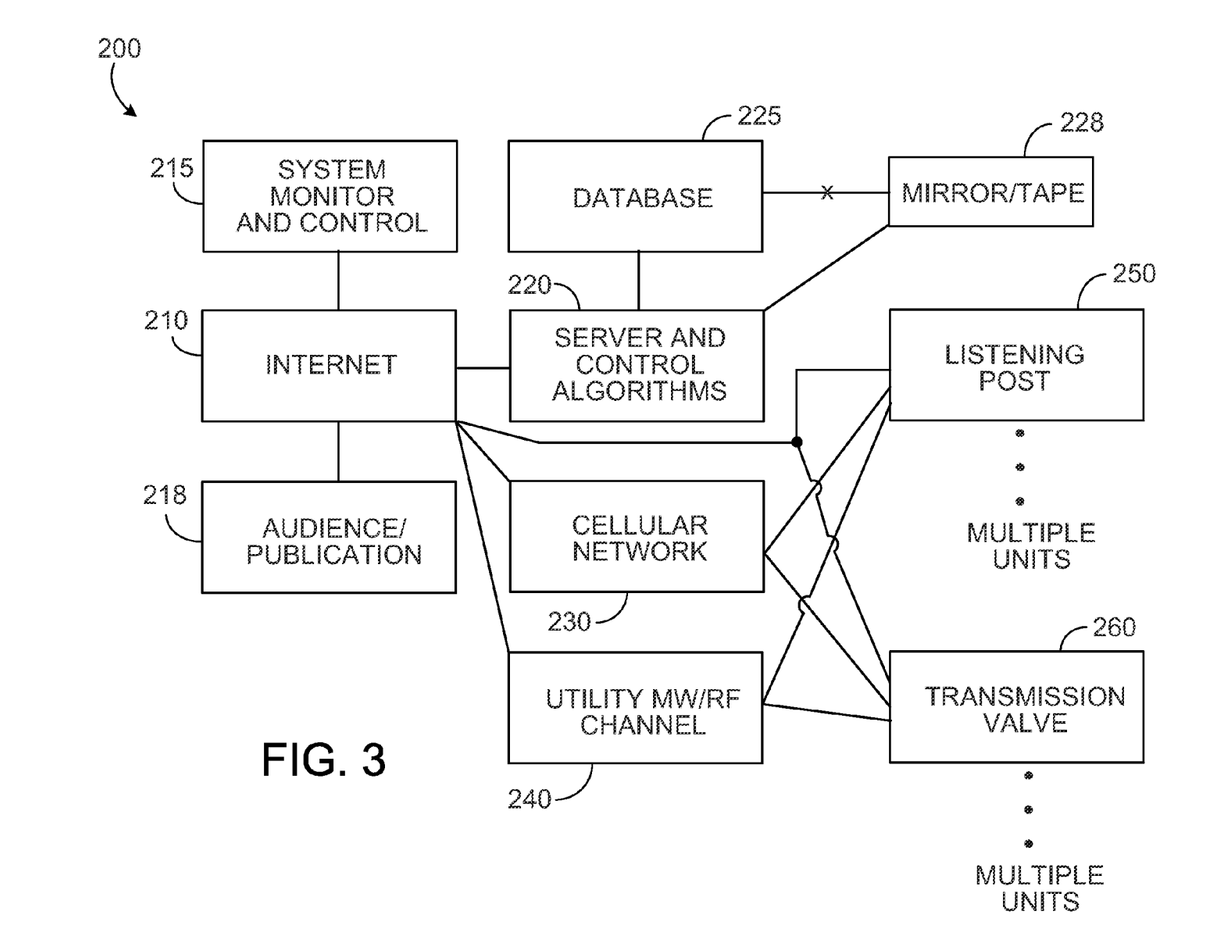
FIG. 3 illustrates an example communication scheme for the pipeline monitoring system.

Referring now to FIG. 3, an example communication scheme 200 for the pipeline monitoring system 100 is illustrated. The communication scheme 200 may rely primarily on a network such as the internet, and may also rely on a secondary network such as a cellular network, or a utility channel (e.g. microwave, radio frequency) to establish direct communication between devices. All communications, end-point authentication, and data-handling may meet regulatory security requirements. In the embodiment shown in FIG. 3, listening posts 250 (e.g., monitoring stations or assemblies) and transmission valves 260 may directly connect to the internet 210, or indirectly connect to the internet 210 via a cellular network 230, or a utility channel 240, or both. The central control module 220 is also communicably coupled to the internet 210, and is communicably coupled to a database 225, where reference profiles and other signal data may be stored. As described above with reference to FIG. 1, the central controller (e.g., component 220) may be communicably coupled to any of the monitoring assemblies (e.g., listening post 250) or valve assemblies (e.g., valve 260) over one or more of any of the networks described herein. FIG. 3 shows one representative communication arrangement, but others are possible (e.g., communicating only over a microwave network, only over an RF network, only over the Internet).

Data in the database 225 may be backed up by a storage device 228 that mirrors the database, for example. For example, valves status and stroking records can be stored and mirrored per record-keeping regulations. Threat determinations and locations corresponding to the threats can also be stored and backed up. The control system 220, via the internet 210, receives measured signals from the listening posts 250. The control system 220 may then, after running control algorithms, issue corresponding command signals to the transmission valves 260, if appropriate.

The control algorithms may monitor flow and changes in flow data to automatically issue commands in certain instances and notify control centers for operator input in other circumstances. In various implementations, a comparison between one or more measured frequencies and one or more baseline frequencies can be used to determine a threat condition. In some implementations, a comparison between one or more measured amplitudes and one or more baseline amplitudes can be used to determine a threat condition. In some cases, measured frequency and amplitude can be compared against baseline values. In some examples, differential values may be computed using measurements from two or more monitoring stations. For example, a differential value or composite value using measurements from a monitoring assembly and the upstream or downstream (or both) assembly may be computed (the assemblies may be in direct communication with each other in some cases, or the central controller may provide the values in some cases). These values can be compared to appropriate baseline values or thresholds to determine whether a threat condition exists.

In some implementations, the control algorithms may be optimized to avoid false positive identifications. For example, in addition to the aforementioned comparison to a baseline value, a rate of change of the measured value may be determined (or a period over which the change occurred may be determined). For example, a 20% change over a period of several hours may not be a concern, but a 20% change over a period of minutes or seconds may be a concern. Percentage changes or gross changes of a measured value versus a previously measured value or baseline value may be monitored to determine a threat condition. The measured value may be compared to the most recently measured value or a set of recently measured values (or, e.g., a composite value representing recent or older values). In some cases, two or more baseline values may be used.

In some cases, baseline values can be associated with certain weather conditions. For example, a baseline value may represent a signal expected when particular weather is occurring (rain, hail, snow, wind, calm, or others). In some cases, the system may be aware of the current weather conditions for an area and the threat detection algorithm may use an appropriate baseline value or values when determining whether a threat exists. As one example, warm ambient temperatures may mean that natural gas customers use less natural gas versus colder ambient temperatures, and the measurements may reflect the reduced demand. Similarly, power outages may affect readings and the algorithms may account for this factor, if appropriate (e.g., after being notified by the central controller). In some examples, measurements can be compared to measurements made on the same date one year previously, two years previously, or the like. The control algorithms may accept input from first responders (i.e. reference profile) and learned seasonal variations. In some implementations, messages may be passed entirely over a secure network (e.g., portions or all of networks described herein may be made secured, such as by implementing secure channels over such networks).

The system may use the described sensors to measure pipeline activity at various intervals. For example, in some cases measurements may be done about once every 5 seconds, 10, seconds, 15 seconds, 30 seconds, every minute, every two minutes, every 5 minutes, every 10 minutes, every 15 minutes, or according to any other appropriate measurement interval. In some examples, more recently installed portions of the pipeline may be monitored less frequently than older portions of the pipeline. In some cases, portions of the pipeline nearer high population densities may be monitored more frequently than portions in remote areas.

In some cases, the measurement interval can be adjusted dynamically. For example, if the nominal interval is set to 15 seconds, the system may dynamically adjust to an interval of every second (or fraction of a second) following an initial threat determination. In addition, data from recent measurements (e.g., measurements made within the last several seconds, minutes, hours, days) may be analyzed. This may help to alleviate false positive determinations, for example, and in some cases the system may not make a final determination of a threat until a predetermined number (e.g., one, two, three, four, etc.) of threat determinations have been made (or alternatively may determine that the threat condition persists for at least a predetermined period of time). The system may alter measurement frequency or adjust thresholds during times of loss of line power, or when various weather or disaster (naturally occurring, e.g. earthquake or tsunami; or human-caused, e.g., terror attack) situations arise. In some implementations, system operators may manually direct different sampling rates or thresholds if they suspect problems in a particular area.

In various examples, adjustments to the algorithms may be made based on learned tendencies, on weather-based factors.

Additionally, when one valve closes, the measurements of upstream or downstream monitors may be affected, which may cause those stations to close one or more valves. In some cases, the central controller (or the monitor that closed the first valve) may send a communication to other monitoring stations to inform them that a valve has been closed. In some examples, the monitoring station that receives such a message may adjust its threat determination algorithm in response, for example to account for the already closed valve.

An overall system monitor and control interface 215 may be used, connected via the internet 210, to interface with the control system 220. The system monitor and control interface 215 may present network graphs, flow graphs, valve statuses, control interfaces, algorithm update interfaces, and user authentication interfaces. In addition to accessing the control system 220 with the system monitor and control interface 215, communications such as alerts via email or voicemail may also be available through an audience interface 218. The audience interface 218 may unidirectionally update or broadcast to certain audiences such as public media, safety channels, businesses, government agencies, homeowners, schools, etc. The audiences may use such information to coordinate countermeasures in case of accidents.

Figure 4:
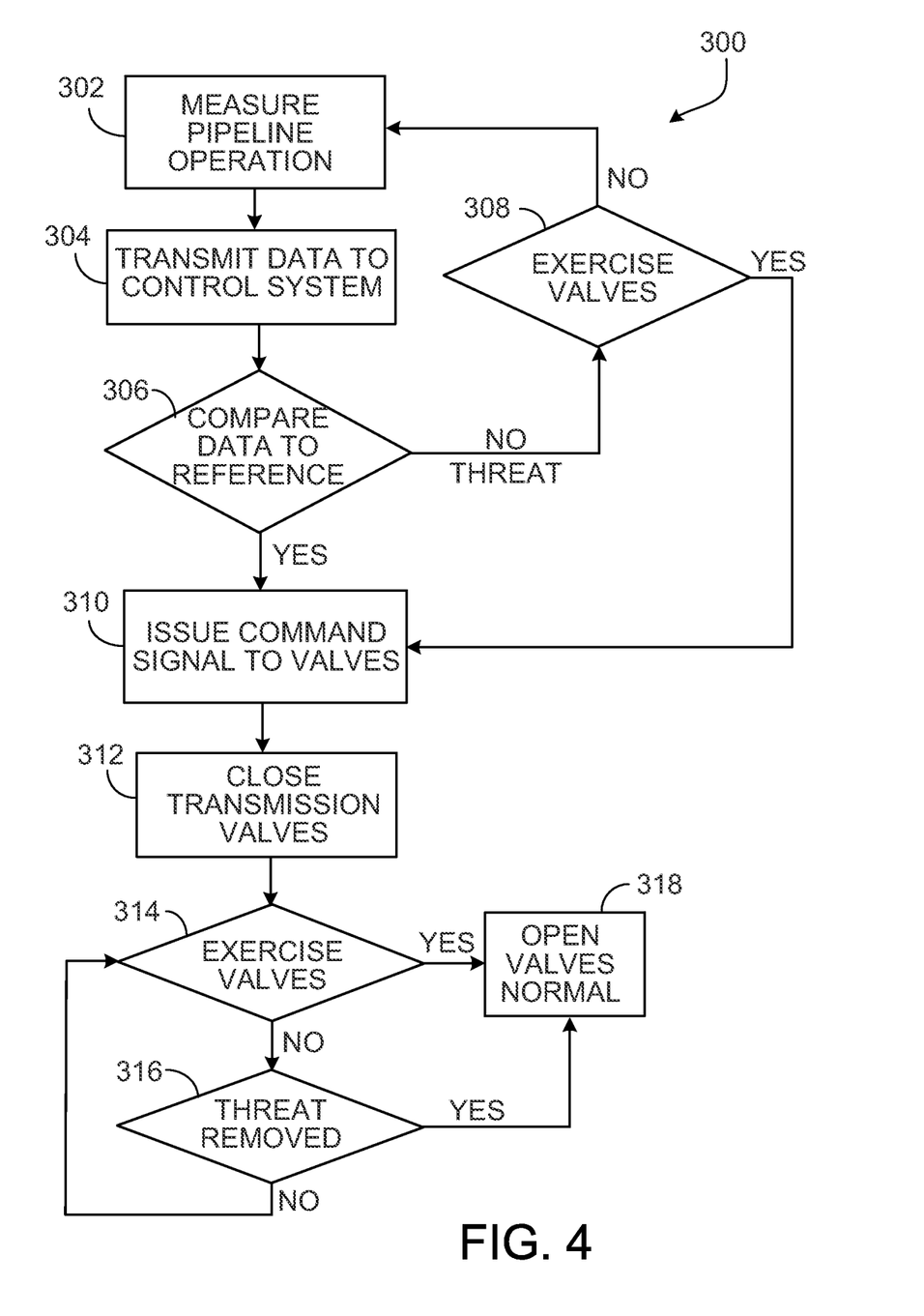
FIG. 4 shows an example method for controlling the monitoring system.

FIG. 4 shows an example method 300 for controlling the pipeline monitoring system 100. The example method 300 starts with a first step 302, where a characteristic associated with a pipeline is measured by sensing devices. Examples of sensing devices may include devices 520, 577, 130 or 135 as described above. The sensing devices may be non-invasive with respect to physical penetration of the pipeline, and may be located on an exterior surface of the pipeline or transmission valve. The sensing devices may measure, for example, a vibration, an audible signal, or a deformation characteristic of the pipeline or the transmission valve. The measured signal at step 302 may then be transmitted to a control system at step 304, via a wired or wireless network, such as the internet for example. In some embodiments, the measured signal may be transmitted along with a message that contains information about the status of pipeline and valves, a time stamp and an IP address related to the measured signal (i.e. identification of the listening post that measures the transmitted signal).

At next step 306, the measured signal may be compared against a reference profile, such as an averaged or signal-processed signal history recorded under standard operation conditions. If the comparison determines there is no threat, the control system then determines if the transmission valves need to exercise at step 308. If the algorithm yields a negative output, then the control system continues receiving and processing the signals measuring pipeline operation at the listening posts at step 302. If the algorithm determines that a valve exercise should be performed, then the control system issues a command signal to exercise one or more valves at step 310. For simplicity, FIG. 4 does not include details associated with security of messages that may be implemented (e.g., encryption and decryption techniques, redundancies, security questions, and the like).

If the comparison determines that a threat is present at step 306, the control system sends command signals to valves to seal at related locations to prevent further damage at step 310. In some embodiments, the control system automatically closes a first fluid transmission valve of the pipeline in response to a determined threat condition, thereby restricting flow of the fluid through the pipeline in a vicinity of the fluid transmission valve.

At step 312, in response to a threat, relevant transmission valves are closed. In the following step 314, the control system determines if the closing of transmission valves is due to valve exercise. If the output is positive, then the control system reopens the valve to a normal condition at step 318 after valve exercise is completed. If the output of step 314 is negative, then the control system awaits for a measured signal message that clears the threat situation. At step 316, if the control system receives a signal clearing the threat situation, then the closed valves are reopened in step 318; otherwise the valves are remained closed at step 312.

With reference again to FIG. 1, in some examples one or more of the sensing assemblies 510 or the valve assemblies 515 may include a local RF radio that a technician can use locally for debug, installation, testing, diagnostics, and the like. Such communications may be received by a smartphone, cell phone, PDA, laptop, tablet device, or the like. This could facilitate installation or commissioning the assembly, for example, or for later maintenance checks.

In some examples, communications may be transmitted over networks that additionally are used by other infrastructure systems. U.S. patent application Ser. No. 13/229,542, filed 9 Sep. 2011 and titled "Managing Light System Energy Use" describes a system of street lights and a central controller that can wirelessly communicate with the street lights, and is hereby incorporated by reference in its entirety. For example, in examples where a particular entity (e.g., a utility company) is responsible not only for fluid pipelines but also for providing another utility (e.g., lighting, electricity, telephone service, television service, Internet service, etc.) messages described herein pertaining to valves, threat conditions, maintenance actions, or system status could share a network with messages related to the another utility. In particular, for example, control messages for a system that provides integrated control of a collection of streetlights (e.g., all streetlights in a neighborhood, city, or entire metro area) and a system as described herein for fluid pipeline management may share communications infrastructure (e.g., secure private network or semi-private network) features for economic, security, or consolidation purposes.

A number of implementations have been described. Nevertheless, it will be understood that various modifications may be made. For example, determination of a threat condition, using the techniques discussed herein, may be performed either at a sensing assembly (e.g., assembly 510, 145 or 125) or at a central control module (e.g. at module 595 or 170). Determinations of a threat condition can be based on more than one presently measured characteristic. For example, a difference quotient that combines two present measurements (including by two separate sensing devices) may be computed, and the quotient may be compared to a previously recorded or calculated value to determine whether a threat condition is likely present. Durations between measurements can vary for particular monitoring assemblies, and can vary with time. Further, the method 300 may include fewer steps than those illustrated or more steps than those illustrated. In addition, the illustrated steps of the method 300 may be performed in the respective orders illustrated or in different orders than that illustrated. As a specific example, the method 300 may be performed simultaneously (e.g., substantially or otherwise). While the discussion herein has focused on monitoring pipeline systems, the techniques and devices described herein may also be used to monitor and respond to threats at well heads, for example a well head at an oil well. In various implementations, valves may be closed following detection of a threat condition by the system. In some implementations, valves may be closed in response to a command provided by an operator, such as an operator working for an electric company or drilling company that becomes aware of a threat. In some cases, different responses may be triggered based on the determined severity of the threat condition. Other variations in the order of steps are also possible. Accordingly, other implementations are within the scope of the following claims.

What is claimed is:

1. A computer-implemented method of detecting and responding to a threat condition, comprising:
receiving, at a monitoring assembly, an input acquired in proximity to a pipeline of a fluid distribution system through which fluid is flowing, the input comprising data associated with a measurement of a vibration characteristic of the pipeline, wherein the data is acquired by a sensor positioned exterior of the pipeline;
determining, by the monitoring assembly, whether the input indicates a threat condition for the pipeline by comparing the data to a baseline vibration measurement of the pipeline, the baseline vibration measurement having been previously recorded;
wirelessly transmitting, by the monitoring assembly, via an antenna of the monitoring assembly and in response to a determined threat condition, a first message for receipt by a first valve assembly associated with a first fluid transmission valve of the pipeline and a second message for receipt by a second valve assembly associated with a second fluid transmission valve of the pipeline, wherein the first fluid transmission valve is located upstream of the monitoring assembly and the second fluid transmission valve is located downstream of the monitoring assembly, and wherein the first message instructs the first valve assembly to cause the first fluid transmission valve to close and the second message instructs the second valve assembly to cause the second fluid transmission valve to close;
wirelessly transmitting, by the monitoring assembly, a third message via the antenna of the monitoring assembly for receipt by a control system of the fluid distribution system, wherein the control system is remote from the monitoring assembly, the third message comprising an indication of the determined threat condition, an indication of the first fluid transmission valve and the second fluid transmission valve, and an identifier associated with the monitoring assembly; and
performing a maintenance routine by periodically at least partially closing and then reopening the first fluid transmission valve or the second fluid transmission valve.

2. The computer-implemented method of claim 1, wherein the fluid is selected from the group consisting of natural gas, water, and oil.

3. The computer-implemented method of claim 1, wherein the determining whether the input indicates a threat condition for the pipeline comprises determining that a first amplitude of the data differs from a second amplitude of the baseline vibration measurement by at least a threshold amplitude amount.

4. The computer-implemented method of claim 1, wherein the determining whether the input indicates a threat condition for the pipeline comprises determining that a first frequency of the data differs from a second frequency of the baseline vibration measurement by at least a threshold frequency amount.

5. The computer-implemented method of claim 1, wherein the messages are wirelessly transmitted over a network, the network selected from the group consisting of a radio frequency network, a microwave network, the Internet, and a cellular network.

6. The computer-implemented method of claim 5, wherein the control system is communicably connected to a plurality of sensing modules via a mesh network.

7. The computer-implemented method of claim 1, further comprising wirelessly transmitting, by the control system, one or more messages for receipt by one or more other valve assemblies associated with one or more other fluid transmission valves of the pipeline to cause the one or more other fluid transmission valves to close.

8. The computer-implemented method of claim 1, wherein the sensor is an acoustic sensor, and wherein the data associated with the measurement of vibration of the pipeline represents an audible signal.

9. The computer-implemented method of claim 1, wherein the message further comprises a time stamp.

10. The computer-implemented method of claim 1, wherein the control system stores an indication of the periodically at least partially closing and then reopening the first fluid transmission valve or the second fluid transmission valve.

11. The computer-implemented method of claim 1, wherein the sensor is in contact with an exterior surface of the pipeline and does not penetrate the pipeline.

12. The computer-implemented method of claim 1, wherein the identifier comprises an internet protocol (IP) address of the monitoring assembly.

13. The computer-implemented method of claim 1, wherein the message further comprises a security question, and wherein at least a portion of the message is associated with a correct answer to the security question.

14. The computer-implemented method of claim 1, further comprising receiving a message from the control system, the received message including a command and a security question, and wherein the command is associated with a correct answer to the security question so that the command is only executed if the security question is correctly answered.

15. The computer-implemented method of claim 1, wherein the control system stores the indication of the determined threat condition and the indication of the first and second fluid transmission valves in an electronic storage device.

16. An apparatus for detecting and responding to a threat condition, comprising:
a monitoring assembly in proximity to a pipeline through which fluid is flowing of a fluid distribution system, wherein the monitoring assembly is configured to receive an input acquired in proximity to the pipeline, the input comprising data associated with a measurement of a vibration characteristic of the pipeline, wherein the data is acquired by a sensor positioned exterior of the pipeline;
wherein the monitoring assembly is configured to: (a) determine whether the input indicates a threat condition for the pipeline by comparing the data to a baseline vibration measurement of the pipeline, the baseline vibration measurement having been previously recorded, and (b) wirelessly transmit, via an antenna of the monitoring assembly and in response to a determined threat condition, a first message for receipt by a first valve assembly associated with a first fluid transmission valve of the pipeline and a second message for receipt by a second valve assembly associated with a second fluid transmission valve of the pipeline, wherein the first fluid transmission valve is located upstream of the monitoring assembly and the second fluid transmission valve is located downstream of the monitoring assembly, and wherein the first message instructs the first valve assembly to cause the first fluid transmission valve to close and the second message instructs the second valve assembly to cause the second fluid transmission valve to close;

wherein the monitoring assembly is configured to wirelessly transmit a third message via the antenna of the monitoring assembly for receipt by a control system of the fluid distribution system that is remote from the apparatus, the third message comprising an indication of the determined threat condition, an indication of the first fluid transmission valve and the second fluid transmission valve, and an identifier associated with the apparatus, wherein the monitoring assembly is configured to perform a valve maintenance routine by periodically at least partially closing and then reopening the first fluid transmission valve or the second fluid transmission valve, and wherein the valve maintenance routine is performed independently of determining threat conditions.

* * * * *